Jan. 15, 1929.

R. H. WENTORF

COOKING VESSEL

Filed Sept. 3, 1927

1,698,928

INVENTOR.
ROBERT H. WENTORF
BY
ATTORNEYS.

WITNESS:

Patented Jan. 15, 1929.

1,698,928

UNITED STATES PATENT OFFICE.

ROBERT H. WENTORF, OF WEST BEND, WISCONSIN, ASSIGNOR TO WEST BEND ALUMINUM COMPANY, OF WEST BEND, WISCONSIN, A CORPORATION OF WISCONSIN.

COOKING VESSEL.

Application filed September 3, 1927. Serial No. 217,373.

This invention relates to pressure cookers of the type illustrated in a prior application filed November 5, 1925, on which Patent No. 1,641,681, September 6, 1927, has issued.

In the construction disclosed in the said patent, the cooker is comprised of a vessel and a detachable cover therefor, the latter being connected to the vessel while in service by means of a plurality of clamps supported upon and attached to the cover, and spaced from each other about its peripheral margin, such clamps engaging the vessel under an overhanging circular projection or rim, formed as a structural feature of the vessel.

The advantages which flow from the positioning of the clamps upon the detachable cover are set forth in the specification of the patent before mentioned. Among such advantages is that which comes from having the vessel itself entirely free from a number of mobile projections, such as would act to interfere materially with the convenient restoration of the vessel to a prime condition which would permit of its immediate subsequent use.

A very wide use of cookers of the construction set forth in the said patent, has demonstrated the existence of a condition in the cooker, as manufactured and distributed, which involves a structural feature to which some inconvenience has been attributed, and which it is the purpose of the present invention to eliminate. In the prior cookers, the handles fixed at two opposite points on the sides thereof, were placed in such a position of proximate elevation with relation to the overhanging circular projection or rim at the top of the vessel, as to prevent any but a carefully predetermined application of the cover to the vessel, by reason of the interference of the said fixed handles with certain of the hooks forming part of the members for clamping the cover upon the vessel.

It became necessary, therefore, in order to fasten the cover upon the vessel, in the manner required for its proper functioning, to position the cover exactly with due regard to the location of the fixed handles, and to see that all of the clamps were positioned in vertical planes entirely clear of those occupied by the fixed handles of the vessel. Two opposite clamps on the cover, not in the vertical planes of the handles, could operate with a clamping action, but in attempting to operate a complemental pair of like opposed clamps, if obstructed by the handles on the vessel, it became necessary to release the first pair of clamps, and re-set the cover in a new position, with the clamps on the cover and the handles on the vessel, out of vertical alignment.

To obviate this objection is the purpose of the present invention, and this result is achieved by placing the fixed handles on the vessel in a horizontal plane below the plane in which they formerly were located, and sufficiently below the circular rim or projection at the top of the vessel, to permit the cover for the vessel to be placed thereon at random, and without any regard for the position of the clamps on the cover in relation to the handles on the vessel.

Under the new arrangement, the cover may be placed upon the cooker in any position, and the clamps may be operated without the previous interference.

The novelty of the invention will be pointed out in the appended claims.

Figure 1:
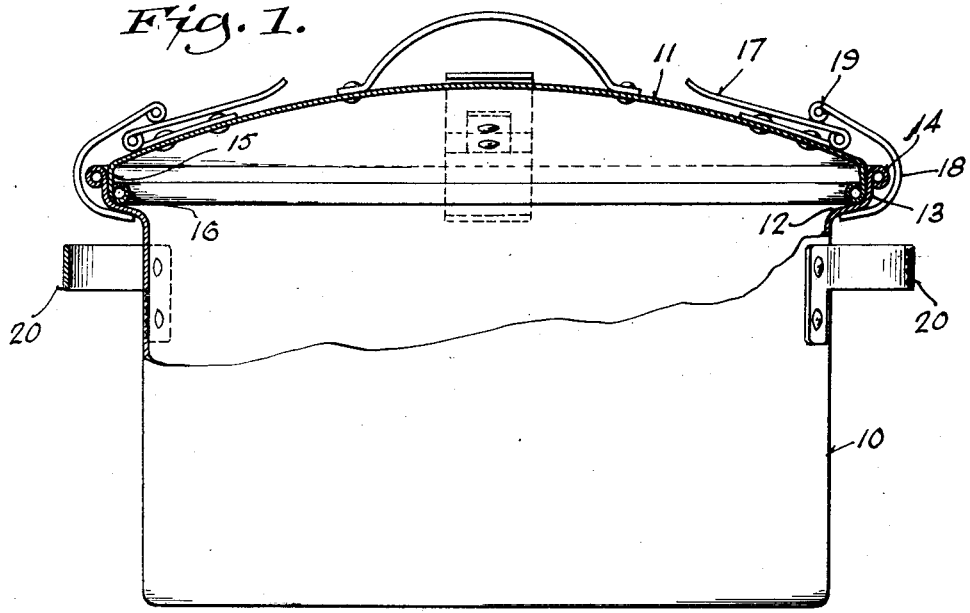
Figure 1 is a view in elevation of my new cooking vessel, partly broken out and sectioned on a transverse central line, to show my improvement therein.

In the drawing, the numeral 10 indicates the vessel, and the numeral 11 the cover therefor, the vessel being drawn from a metal disc so as to form a shell having a bottom and a vertically standing circular wall, the latter at its upper edge being outturned as at 12 to form a circular seat, and again turned vertically to provide the wall 13, forming a boundary for the seat. The upper edge of the wall 13 is finished by a bead 14, which serves to maintain the contour of the wall 13 against displacement.

The cover 11 is provided with a downturned wall 15, having approximately the height of the circular wall 13, so as to afford a widening line of contact between the vessel and the cover when the latter is placed thereon. The wall 15 of the cover, at its lower edge, is formed as a bead 16, to maintain the contour of the said wall, and prevent its displacement.

The cover 11 is provided with a plurality of clamping devices, preferably four in number, set quartering with respect to each other, and permanently attached to the cover. To the lever 17, pivoted on the cover, the upper end of a resilient hook 18, formed from a strip of flat metal, is pivoted, as at 19, to the clamping lever 17 at a point intermediate the pivotal point of the latter and its inwardly extending free end. The free end of the hook is adapted to automatically engage the under side of the seat 12 on the vessel, when the clamping lever 17 is thrown inwardly so as to lie close to the cover, in the position shown in Fig. 1.

Figure 2:
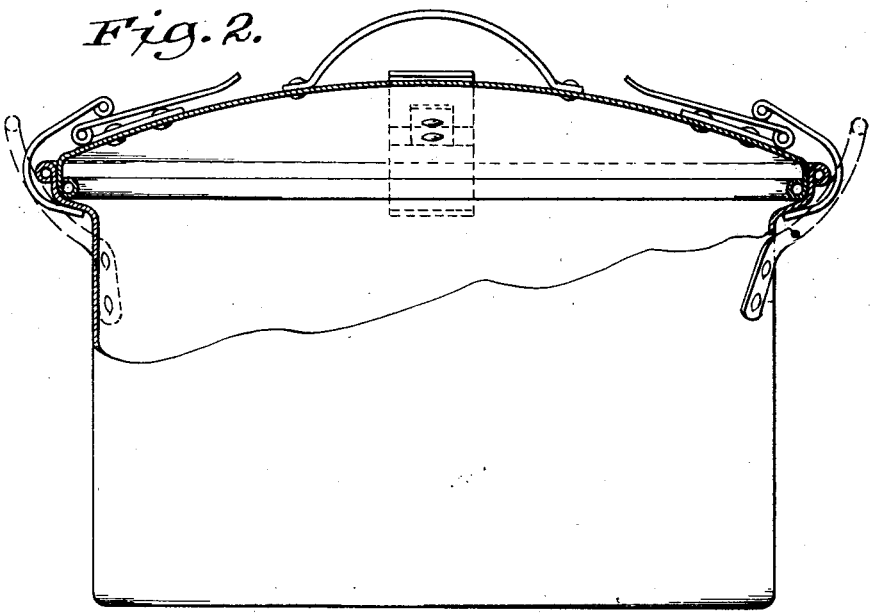
Fig. 2 is a like view of the older type of the same vessel, showing the interference which is obviated by my improvement.

In manufacturing the prior devices, the handles for the vessel were attached in the manner shown in Fig. 2, such handles being so close to the enlarged circular rim at the top of the vessel, so as to interfere with the operation of the clamps, when the cover was inaccurately indexed in its seat on the vessel. The dotted lines at the right and left of Fig. 2, showing outlines of such handles, indicating the nature of the interference which took place. The operation of the hooks was thus interfered with by the presence of the handles, and it often required re-adjustment of the cover upon the vessel before the clamps could be operated without interference.

In the present invention, I have changed the form of the handles 20, and have located them at opposite points on the sides of the vessel, so as to be entirely below the operating range of the hooks 18, when the cover is placed in position, thus enabling the hooks when operated in a clear space and to pass freely into engagement with the circular enlargement at the top of the vessel, wholly irrespective of the location of the handles. By this means, the cover may be placed upon the vessel without consideration of the relative location of the points on the vessel which are to be engaged by the hooks. The improvement greatly facilitates the use of the vessel.

Before placing the cover upon the vessel, the hooks 18 must first be folded over against the clamping levers 17, and both the hooks and clamping members turned back upon the cover. The cover may then be positioned on the vessel, and the clamping levers and hooks thrown outwardly, whereupon the hooks will swing under the seat 12, and with a reverse movement of the clamping levers 17, the cover will be held tightly in its seat on the vessel, in the manner indicated in the drawings.

Having thus described my invention, what I claim and desire to secure by Letters Patent of the United States, is:

1. The combination of a pressure cooking vessel constituted of metal, and having at its upper edge an outwardly extending circular rim forming a seat for a cover, and handles oppositely arranged on the sides thereof in a plane at a distance below the rim to provide a clear space between them and the rim, with a cover carrying a plurality of pivoted clamping levers with hooks pivoted thereto, the said hooks being adapted to operate in the said clear space without interference by the handles in any position in which the cover is applied and to automatically engage under the circular rim of the vessel and above the plane of the handles, to fasten the cover in the seat thereof, when the clamping levers are thrown into clamping position.

2. The combination of a pressure cooking vessel constituted of metal, and having at its upper edge an outwardly extending circular rim forming a seat for a cover, and handles oppositely arranged on the sides thereof in a plane at a distance below the rim to provide a clear space between them and the rim, with a cover carrying a plurality of pivoted clamps adapted to operate in the said clear space without interference by the handles in any position in which the cover is applied and to engage under the circular rim of the vessel and above the plane of the handles, to fasten the cover in the seat thereof, when the clamps are thrown into clamping position.

3. The combination of a pressure cooking vessel constituted of metal, and a cover supported at the top thereof, the vessel being provided with handles oppositely arranged on the sides thereof in a plane at a distance below the top of the vessel to provide a clear space between the top of the vessel and the handles, with a cover carrying a plurality of pivoted clamps adapted to operate in the said clear space without interference by the handles in any position in which the cover is applied and to engage the vessel above the plane of the handles, to fasten the cover to the vessel when the clamps are operated into clamping position.

In testimony whereof, I have signed my name at Milwaukee, this 1st day of September, 1927.

ROBERT H. WENTORF.